(12) United States Patent
Miyamoto et al.

(10) Patent No.: US 8,497,953 B2
(45) Date of Patent: Jul. 30, 2013

(54) PRISM SHEET, AND BACKLIGHT UNIT AND LIQUID CRYSTAL DISPLAY DEVICE USING PRISM SHEET

(75) Inventors: Masashi Miyamoto, Kitaadachi-gun (JP); Masanao Takashima, Kitaadachi-gun (JP); Ryuichi Saga, Kitaadachi-gun (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 12/675,221

(22) PCT Filed: Aug. 25, 2008

(86) PCT No.: PCT/JP2008/065075
§ 371 (c)(1), (2), (4) Date: Feb. 25, 2010

(87) PCT Pub. No.: WO2009/028439
PCT Pub. Date: Mar. 5, 2009

(65) Prior Publication Data
US 2010/0245717 A1    Sep. 30, 2010

(30) Foreign Application Priority Data

Aug. 28, 2007   (JP) ................................. 2007-220939

(51) Int. Cl.
*G02F 1/1335* (2006.01)
(52) U.S. Cl.
USPC ............................................. 349/64; 349/65
(58) Field of Classification Search
USPC .................................................... 349/61–65
See application file for complete search history.

(56) References Cited

U.S. PATENT DOCUMENTS

| | | | |
|---|---|---|---|
| 5,764,073 A | 6/1998 | Sadamatsu | |
| 5,828,488 A * | 10/1998 | Ouderkirk et al. | 359/485.02 |
| 5,995,288 A * | 11/1999 | Kashima et al. | 359/599 |
| 6,280,063 B1 * | 8/2001 | Fong et al. | 362/333 |
| 7,271,862 B2 * | 9/2007 | Matsunaga et al. | 349/64 |
| 7,297,381 B2 * | 11/2007 | Cojocariu et al. | 428/1.3 |
| 2006/0203146 A1 * | 9/2006 | Bang | 349/69 |
| 2008/0055523 A1 * | 3/2008 | Nishihara et al. | 349/96 |
| 2010/0079701 A1 * | 4/2010 | Murayama et al. | 349/64 |

FOREIGN PATENT DOCUMENTS

| | | |
|---|---|---|
| JP | 09-005504 A | 1/1997 |
| JP | 2004-061598 A | 2/2004 |
| JP | 2006-297814 A | 11/2006 |
| JP | 2008-027687 A | 2/2008 |

OTHER PUBLICATIONS

English translation of JP 2004-061598.*

* cited by examiner

*Primary Examiner* — Edward Glick
*Assistant Examiner* — David Chung
(74) *Attorney, Agent, or Firm* — Edwards Wildman Palmer LLP

(57) ABSTRACT

Provided is a prism sheet which has high effects of suppressing Moiré fringes, high front luminance and reduced number of components when it is used as a prism sheet for a backlight unit for a liquid crystal display device. The prism sheet has a prism row having ridges formed in parallel to each other at equivalent intervals on one surface and a light diffusion layer containing porous particles on the other surface. The prism sheet preferably has the prism row on one surface and the light diffusion layer on the other surface by having a light-transmissive substrate in between.

9 Claims, 4 Drawing Sheets

PRISM SHEET, AND BACKLIGHT UNIT AND LIQUID CRYSTAL DISPLAY DEVICE USING PRISM SHEET

CROSS-REFERENCE TO PRIOR APPLICATION

This is the U.S. National Phase Application under 35 U.S.C. §371 of International Patent Application No. PCT/JP2008/065075 filed Aug. 25, 2008, which claims the benefit of Japanese Patent Application No. 2007-220939 filed Aug. 28, 2007, both of which are entirely incorporated by reference herein. The International Application was published in Japanese on Mar. 5, 2009 as WO 2009/028439 A1 under PCT Article 21(2).

FIELD

The present invention relates to a prism sheet, which is used as a component of a backlight unit of a liquid crystal display device (LCD) and the like.

ART

In a liquid crystal display device that is equipped in a computer, a mobile phone, a digital camera and the like, a backlight unit is integrated as a device for illuminating the liquid crystal display surface from the back surface side. One example of the general constitution of the liquid crystal display device is shown in FIG. 1. In a conventional backlight unit 2, the light radiated from a light source 3 such as the cold-cathode tube (CCFL) and the light-emitting diode (LED) is incident on a light guide plate 5 while being reflected from a reflection sheet 6 and the like, and the light emitted from the upper surface of the light guide plate 5 is collected in the front direction through a light diffusion film (lower diffusion film) 7. The light emitted from the light diffusion film (lower diffusion film) 7 is incident to the prism sheet 8 in which the prism row is formed from the surface where the prism row is not formed (non-prism surface), and emitted from the surface where the prism row is formed (prism surface), and whereby the light is further collected strongly in the front direction. Thus, the light emitted from the prism surface is incident from the lower surface of a liquid crystal module 1 that has the liquid crystal display surface, and used as illumination from the back surface side. Sometimes, a light diffusion film (upper diffusion film) 9 is arranged between the prism sheet 8 and the liquid crystal unit 1.

As described above, the prism sheet 8 has an action that enhances the luminance in the front direction when viewed from an observer of a liquid crystal display by refracting the light emitted from the light diffusion film (lower diffusion film) in the prism oblique plane, which is formed on a surface of a transparent substrate, and deflecting it in the more frontal direction. At this time, as for the direction where the prism sheet 8 is arranged in the light path, the non-prism surface may be arranged toward the emitting surface of the light guide plate, and reversely, the prism ridges may be arranged toward the emitting surface of the light guide plate. However, in the conventional backlight unit, there may be many cases where the non-prism surface is arranged toward the emitting surface of the light guide plate since adjustment of the incidence angle to the prism sheet is not necessary.

The prism sheet is generally formed such that the ridges of continuous prism rows are maintained to have equal intervals and be in parallel to each other, and each of the prism units usually has the cross-section of the isosceles triangle. Therefore, if it is overlapped with the compartments of the liquid crystal cells arranged at equal intervals, there may be many cases where a visible pattern called Moiré fringes is formed, and the shading pattern is observed when the images are observed.

Moiré fringes are fringe patterns that occur between the pitch of the prism row and the pitch of the pixels of the liquid crystal panel, and are coarser than each pitch interval.

If such Moiré occurs, a shading fringe pattern occurs on the background of the liquid crystal display surface, which becomes a cause of the image quality deterioration of the display image. Particularly, suppression of Moiré fringes becomes important in a liquid crystal display device that needs to have high resolution display.

As a means of making Moiré fringes hardly occur, performed is the insertion of the light diffusion film (upper diffusion film) into the emitting side of the prism sheet. The insertion of the upper diffusion film is not necessarily enough in effects of reducing Moiré fringes, and is a cause of reducing the luminance of the liquid crystal display surface. However, the insertion of the upper diffusion film has been conventionally adopted as effective measures for reduction of Moiré fringes.

However, recently, the liquid crystal display device is strongly demanded for further thinning, and also for the backlight unit, so the cutback of the elements and, thinning of the elements and the whole constitution while maintaining equal performances to those of conventional ones are considered. For example, in a backlight unit where the prism ridges of a prism sheet are arranged toward the emitting surface of the light guide plate, depending on a combination of the design of the light guide plate with the design of the prism sheet, enough light-collecting effects may be obtained though the light diffusion film is not arranged between the emitting surface of the light guide plate and the prism sheet.

In the case of inserting a prism sheet that has a prism row on one surface into a light path, the difference of light-collecting effects will be explained below between the case where the non-prism surface is arranged toward the emitting surface of the light guide plate, and the case where the prism ridge are arranged toward the emitting surface of the light guide plate.

The arrangement of each of the optical elements of general backlight unit, in which the non-prism surface of a prism sheet is arranged toward the emitting surface of the light guide plate, is shown in FIGS. 2 and 3. FIG. 2 is a perspective view that shows the arrangement of a prism sheet in a general backlight unit, and FIG. 3 shows one example of the light path in the general backlight unit. The light emitted from the upper surface of the light guide plate 15 is collected in the more frontal direction by the diffusion effects of the light diffusion film (lower diffusion film) 17, whereby it becomes emission light having broad distribution of the emission angle, and is incident from the non-prism surface of the prism sheet 18. Then, the light is refracted by the difference of the refractive indexes between the material constituting the prism unit and the air, during the time to be emitted from the prism row via the prism sheet substrate, and the light having broad distribution of the emission angle is emitted being further deflected in the front direction. If the light diffusion film (lower diffusion film) 17 is not present and the light is only refracted in the prism emitting surface, there may be many cases where the light emitted from the light guide plate is not necessarily bent enough to the front direction as shown in FIG. 3, and the luminance of the side close to the light source does not rise enough. Therefore, in order to make the luminance distribution in the front direction of the backlight to be high and uniform, first it is necessary to make the light, which has been broadened in the angle distribution, incident on the prism sheet, and the light diffusion film (lower diffusion film) 17 is essential. On the other hand, in order to make the prism sheet 18 exert the light-collecting operation sufficiently for the light diffused in broad angle in the front direction at the light diffusion film 17, and collect the light emitted from the light guide plate to the front direction of the backlight in good efficiency, it is necessary that two pieces of the prism sheet 18 are overlapped, and their prism rows are arranged to be nearly orthogonal. Therefore, at least three pieces of optical sheets are necessary including one piece of the light diffusion film (lower diffusion film) and two pieces of the prism sheets.

On the other hand, shown in FIG. 4 is the arrangement of each of the optical elements of the backlight unit in which the prism surface of the prism sheet is arranged toward the emitting surface of the light guide plate. The light emitted from the upper surface of the light guide plate 25 enters the prism row via the air layer, and is incident on the inside of the ridges from one oblique plane of the prism unit in the prism row 32. Then, the light that is incident on the other oblique plane at an incidence angle greater than the critical angle, is subject to the total reflection by this oblique plane, and greatly changes the direction to be collected and emitted to the front direction of the backlight. Accordingly, by performing a designing of a prism row that is adapted to the properties of the light guide plate such as emission light direction, it is possible to attain high and uniform luminance distribution to the front direction of the backlight with no use of the light diffusion film (lower diffusion film), but with use of only one piece of the prism sheet.

As described above, by adopting the arrangement of a prism sheet as described above, there are advantages that the number of components can be reduced, and that thinning of the backlight unit is possible, and furthermore that the productivity improves. However, on the other hand, stronger Moiré fringes are likely to be observed as compared to the case of conventional backlight unit in which the lower diffusion film is used. In the conventional method of preventing Moiré fringes using the upper diffusion film (see, for example, Patent Document 1 or Patent Document 2), there is possibility that Moiré fringes could not be reduced to practically usable level even at the large expense of the luminance of the liquid crystal display surface by elevating the haze of a diffusion film.

In the method of Patent Document 1, the second diffusion plate that has a coarse surface by texturing is arranged between the prism sheet and the liquid crystal module. In the method of Patent Document 1, the number of components increases, which incurs additional costs in the assembly, and the thickness of the backlight unit increases by a large margin, which does not follow the recent demand of thinning. In addition, in the method of Patent Document 2, a diffusion film that has relatively low haze containing resin particle and the like as diffusion materials is arranged between the prism sheet and the liquid crystal module. In the method of Patent Document 2, the number of components increases, and since commercially available diffusion film is applied as it is, it is not enough to suppress Moiré fringes, which cannot be said to be suitable for a high resolution-display of recent liquid crystal display devices.

A variety of backlight units has been considered conventionally, which has advantage of reducing the number of components, and uses the constitution in which the prism surface of the prism sheet is toward the emitting surface of the light guide plate. However, any of them is not enough for suppressing Moiré fringes, and has problems to be solved. For example, any of the backlight unit constituted as described below is considered to have some effects in suppressing Moiré fringes, though still not enough. For example, it has been considered that the non-prism surface of the prism sheet is made as a coarse surface as a means to obtain uniformity of the luminance of the backlight (see, for example, Patent Document 3). In addition, it has been considered that the light emitted from the light guide plate is incident on the prism surface of the prism sheet and a diffusion plate whose surface has been subject to the concave-convex process or in which diffusion particles are contained is arranged on the non-prism surface of the emitting side (see, for example, Patent Document 4). In addition, it has been considered that lens in a prism shape is formed on the incident surface, and a light diffusion layer containing light diffusion materials is provided on the emitting surface (see, for example, Patent Document 5).

However, in the prism sheet of Patent Document 3 for which a conventional process of making a coarse surface is performed on the non-prism surface, the number of components is reduced, but suppression of Moiré fringes is not enough. In addition, with the constitution of Patent Document 4 in which a diffusion plate is inserted to the emitting surface side that is the non-prism surface of the prism sheet, the constitution is effective in removing the dot images that are formed in the reflection plate for the light guide plate, but the removing of Moiré fringes is not considered in the constitution. Even if the removing of Moiré fringes with the diffusion plate is considered, the luminance reduction in the liquid crystal display surface is likely to occur, and possibly becomes hindrance to the whole thinning of the liquid crystal display device since the thickness of the diffusion plate becomes thick. Furthermore, with the prism sheet of Patent Document 5 in which the conventional light diffusion layer is used on the non-prism surface, effects of widening the viewing angle are obtained, and the number of components is reduced similarly to the prism sheet of Patent Document 1, but the effect of suppressing Moiré fringes is limited, and even if the suppression is possible, it may cause the luminance reduction in the liquid crystal display surface.

As described above, in the prism sheet described in Patent Documents 3 to 5, a variety of light diffusion layers are formed in the emitting surface side of these prism sheets. However, the constitutions of these light diffusion layers have no difference from the constitution that is used in a conventional light diffusion film for preventing Moiré in which the surface is made as a coarse surface, or the light diffusion materials conventionally used are contained. With the new constitution in which the prism surface is directed to the emitting surface of the light guide plate, new consideration for reduction of Moiré fringes is not particularly conducted despite further likeliness of the occurrence of Moiré fringes. That is to say, in the prism sheet described in Patent Documents 3 to 5, the light collected from the emitting surface of the prism sheet is further incident on the light diffusion layer, and thus there is a fear of causing luminance reduction of the liquid crystal display surface, without any particular effects for reduction of Moiré fringes. Although any one of these prism sheets could be directed to uniformity of the luminance of the liquid crystal display surface, they have no primary object of actively preventing occurrence of Moiré fringes, and also have limited effects therefor.

On the other hand, use of porous particles as diffusion particles is performed on the diffusion layer of the light diffusion film (see Patent Documents 6 and 7). Patent Document 6 describes a light diffusion film, which has a light diffusion layer that is formed from spherical porous silica having the average primary particle size being equal to or greater than 2.5 μm and equal to or less than 10 μm, and a resin binder.

Patent Document 7 describes a light diffusion sheet, in which porous transparent microparticles are dispersed in the transparent base material layer. However, the light diffusion film and the light diffusion sheet are not different in quality for basic functions and form from the conventional light diffusion films and sheets although they have objects of improving the light diffusion function by use of the porous particles. It has not been revealed functions that are not present in the past with use of inherent properties of the light diffusion layer that has the porous particles, much less disclosed exerting suppression action for Moiré fringes by combination with the prism sheet.

Patent Document 1: JP-A-H06-034972
    Patent Document 2: JP-A-H06-102506
    Patent Document 3: JP-A-H05-341132
    Patent Document 4: JP-A-H09-211230
    Patent Document 5: JP-A-H10-160914
    Patent Document 6: JP-A-2004-061598
    Patent Document 7: JP-A-2004-348000

SUMMARY

In one embodiment the present invention provides a prism sheet arranged on an emitting surface of a light guide plate in a backlight unit. The prism sheet includes a prism row on an incident surface side of a light-transmissive substrate; and a light diffusion layer that contains porous particles on the emitting surface side of the light transmissive substrate; wherein the porous particles are irregular porous silica particles, and the light diffusion layer is formed by a coating material containing a resin binder and the porous silica particles, wherein the light diffusion layer has a dry thickness of 2 to 10 μm.

In another embodiment the present invention provides a backlight unit for a liquid crystal display device. The backlight unit includes a light source arranged on at least one end face of a light guide plate, and a prism sheet is arranged on at least one emitting surface side such that prism ridges of the prism sheet are arranged toward the emitting surface of the light guide plate.

DETAILED DESCRIPTION

Figure 1:
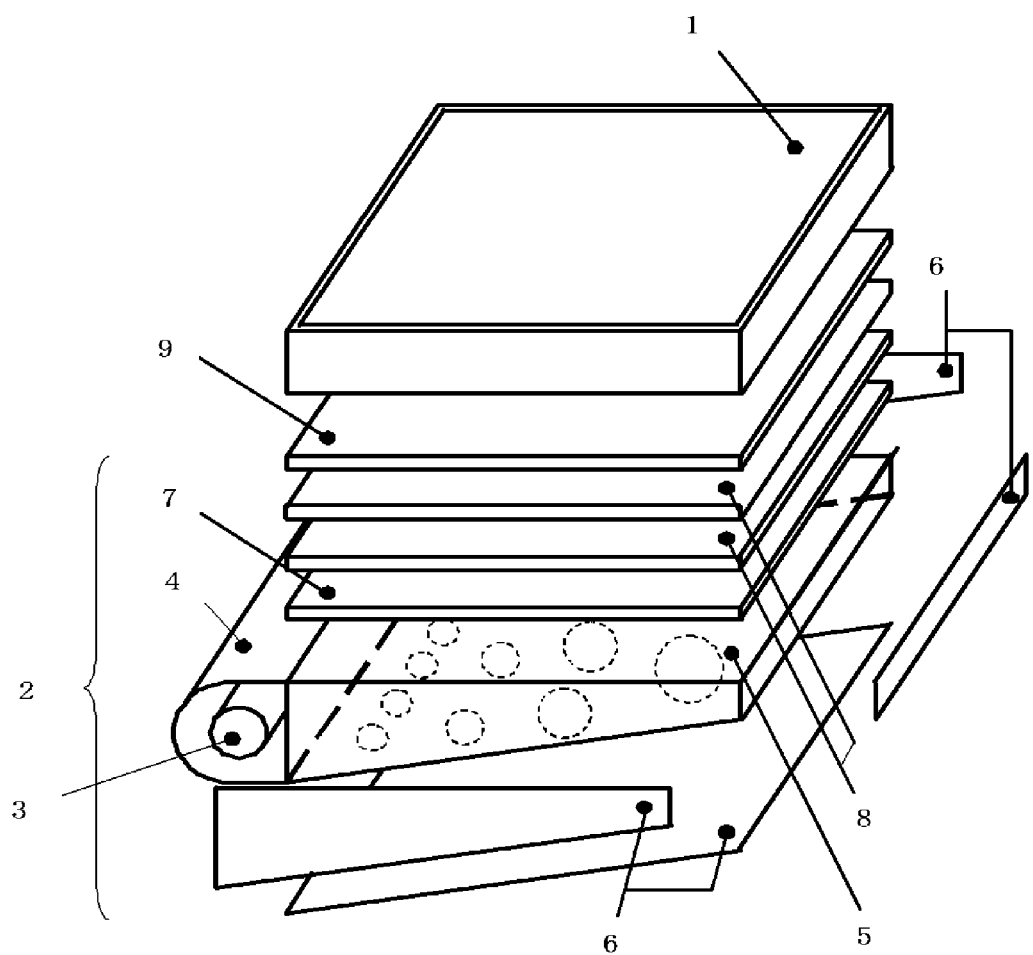
FIG. 1 is an exploded diagram that shows one example of the general constitution of a liquid crystal display device.
Figure 2:
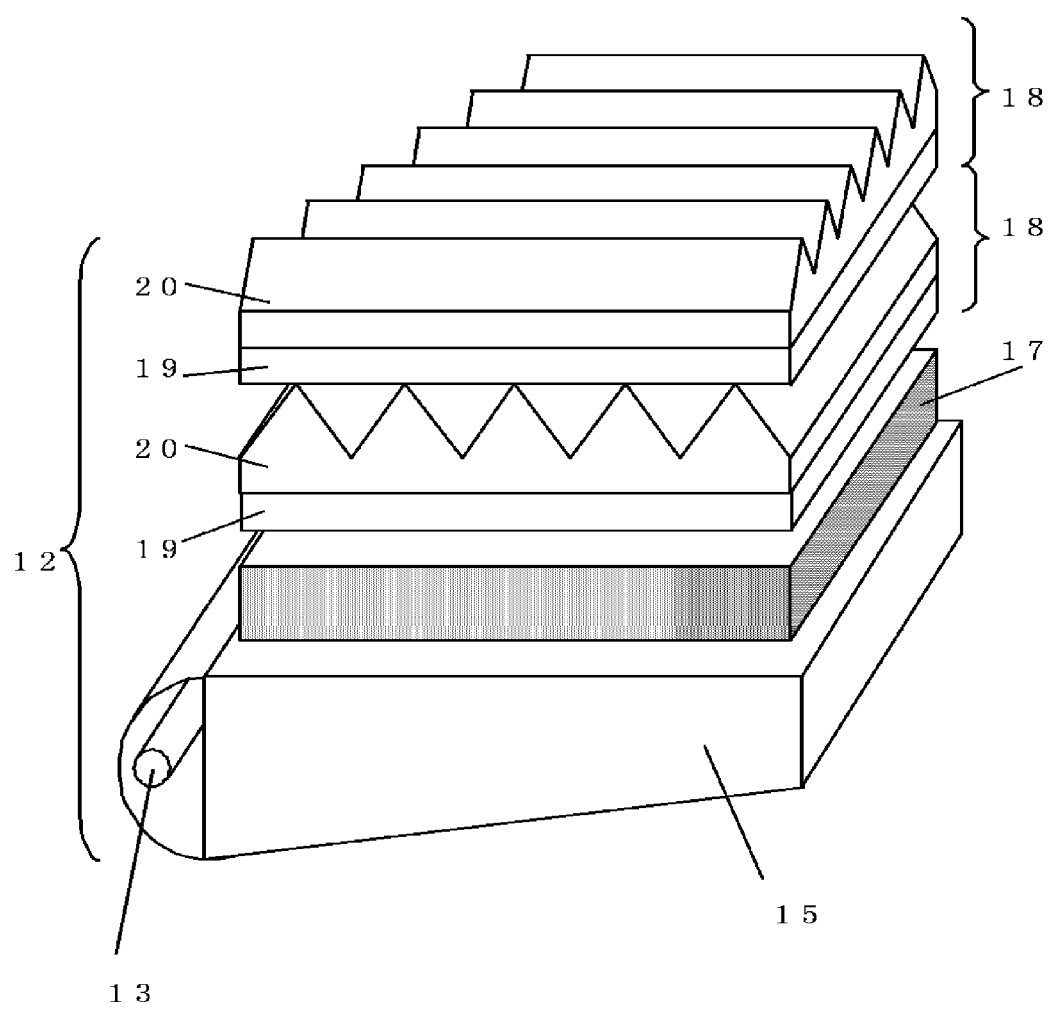
FIG. 2 is a perspective view that shows the constitution of the backlight unit where the non-prism surface of the prism sheet is arranged on the emitting surface side of the light guide plate.
Figure 3:
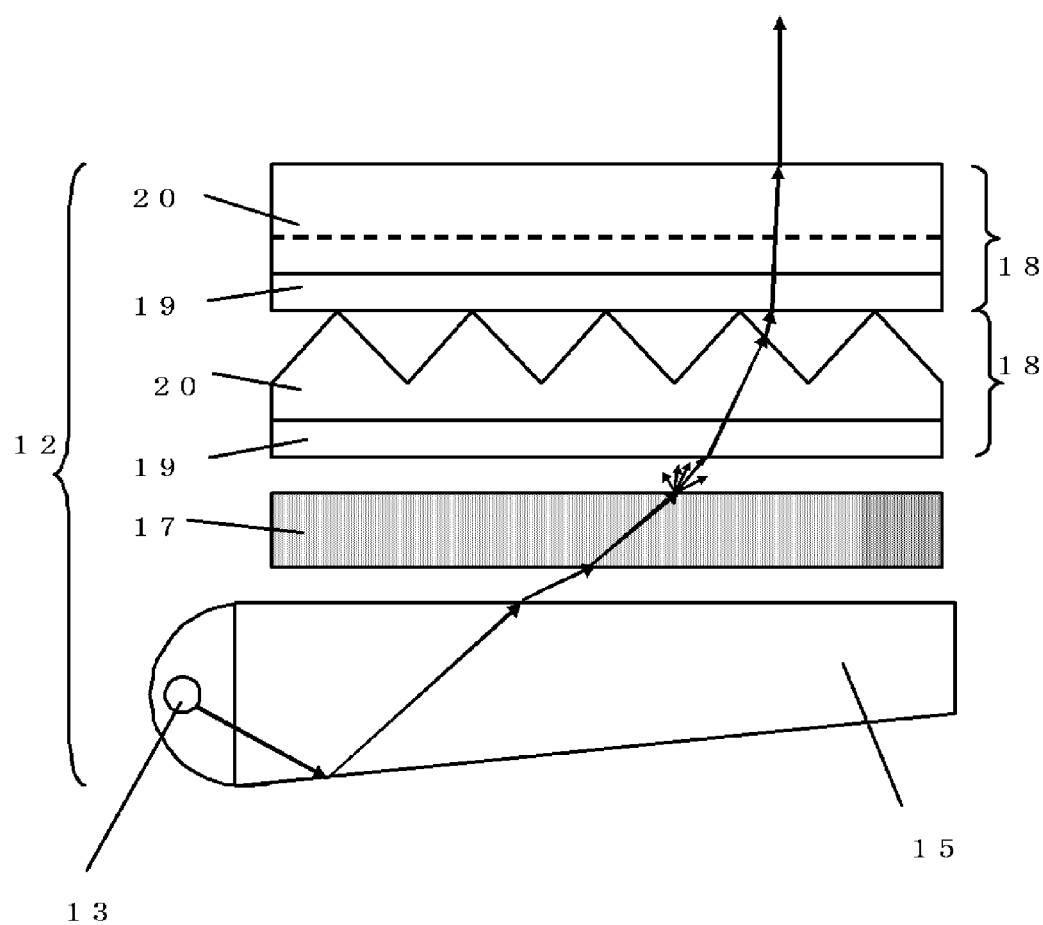
FIG. 3 is a conceptual diagram that shows a portion of light path from the light source in the backlight unit shown in FIG. 2.
Figure 4:
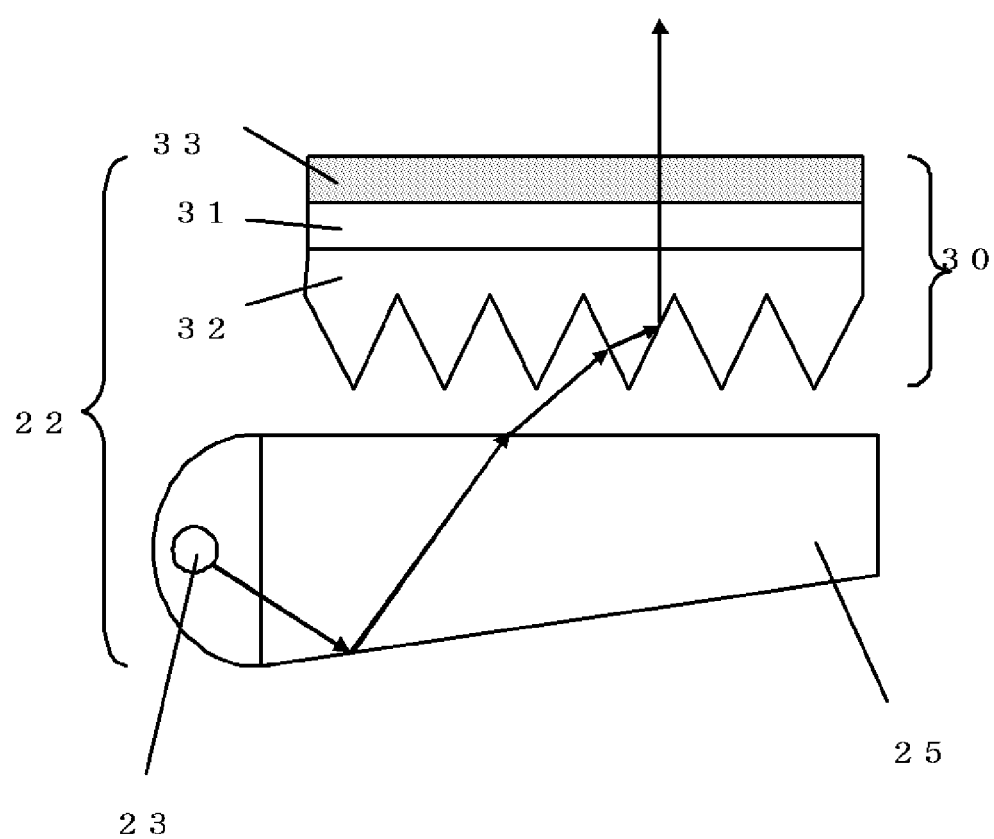
FIG. 4 is a conceptual diagram that shows the constitution of the backlight unit where the prism surface of the prism sheet is arranged on the emitting surface side of the light guide plate, and a portion of the light path from the light source.

The object of the present invention is to provide a prism sheet, which exerts high effects of suppressing Moiré fringes, effects high front luminance of a backlight unit or a liquid crystal display surface, and attains less number of components than those of conventional backlight unit, thereby achieves thinning of the liquid crystal display device when it is used as a prism sheet for the backlight unit used in the liquid crystal display device.

The present inventors have found that a prism sheet can be manufactured that can prevent Moiré without lowering the front luminance largely by using specific porous particles and forming a light diffusion layer containing these porous particles on the non-prism surface of the prism sheet, to bring the present invention to completion.

To be specific, the present invention provides a prism sheet that is characterized by having a prism row on one surface, and having a light diffusion layer that contains porous particles on the other surface.

Furthermore, the present invention provides a backlight unit for a liquid crystal display element that is characterized in that a light source is arranged on at least one end face of a light guide plate, and the above-described prism is arranged on at least one emitting surface side such that the prism ridges are toward the side of the emitting surface of the light guide plate.

Furthermore, the present invention provides a liquid crystal display device that is characterized by using the above-described backlight unit.

The prism sheet of the present invention has a light diffusion layer that contains porous particles on the opposite side of the surface that has the ridges of the prism row, and arranged adjacent to the light guide plate such that the ridges of the prism row are toward the emitting surface side of the light guide plate. Therefore, the prism sheet of the present invention has constitution in which conventional upper diffusion film for suppressing Moiré fringes is integrated with the prism sheet, which makes it possible to reduce the component number of the backlight unit, and make the total thickness thin. Furthermore, in the constitution of the backlight unit using the present prism sheet, the light that is emitted from the light guide plate and incident on the surface that has the ridges of the prism row of the prism sheet, and through the prism portion, the light is collected in the front direction of the liquid crystal display surface at the prism portion, and diffused in the light diffusion layer. Since the porous particles contained in the light diffusion layer contain many fine pores, and the fine pores include the air, the light that is incident on the light diffusion layer repeats reflection and refraction over many times during passing through these fine pores, the binder holding them, and the air in the fine pores. As a result, the light becomes diffused well even with relatively small content of the porous particles, and relatively thin film thickness of the light diffusion layer as compared to the case using the usual resin particles. Therefore, the incident light to the prism sheet is well scattered and it is possible to suppress occurrence of Moiré fringes and also reduce a loss of light when it is transmitted through the prism sheet, and maintain high value of the total light transmittance. Therefore, it is possible to suppress occurrence of Moiré fringes while maintaining high luminance of the liquid crystal display surface.

The reason for the above-described effects of the present invention has not been necessarily elucidated. However, these porous particles fundamentally have the concavo-convex finer than the order of the particle size by a few stairs on the porous particles surface, and these are usually finer as compared with the pitch of the ridge lines of the prisms and the pitch of the pixels of the liquid crystal element. Therefore, it is considered that the light path of the beam passing through regular structure of the prism, the liquid crystal pixels and the like, is disturbed more effectively through reflection and refraction by the fine structure of the surface of such porous particles, and thus occurrence of Moiré fringes can be effectively suppressed even with small addition amount of the porous particles as compared to diffusion particles having no such fine concavo-convex on the surface.

The prism sheet of the present invention can reduce the number of components of the backlight unit, and make thin the total thickness of the backlight unit since the prism sheet has a light diffusion layer serving as a light diffusion film as integrated on the surface opposite to the surface having the ridges of the prism row.

Furthermore, the porous particles contained in the light diffusion layer diffuse the incident light effectively with relatively small content; and thus when the prism sheet of the present invention is used as a prism sheet that constitutes the backlight unit used in a liquid crystal display element, it can suppress occurrence of Moiré fringes and also maintain high luminance of the liquid crystal display surface.

Furthermore, the backlight unit in which the above-described prism sheet is arranged adjacent to the emitting surface of the light guide plate, can be thinned, and has reduced number of components, and can suppress occurrence of Moiré fringes while maintaining high luminance of the liquid crystal display surface when used as a light source of the liquid crystal display device.

Furthermore, the liquid crystal display device using the above-described backlight unit of the present invention can be thinned, and has no occurrence of Moiré fringes, and can maintain high luminance of the liquid crystal display surface.

BEST MODE FOR CARRYING OUT THE INVENTION

The prism sheet of the present invention has a prism row on one surface, and has a light diffusion layer that contains porous particles on the other surface. The prism row has ridges that are formed in parallel to each other at equal intervals, which is preferable in view of ease manufacture.

As for the constitution of the prism sheet, the prism sheet may have the three-layer constitution wherein a prism row and a light diffusion layer are formed separately on both surfaces of a transparent substrate or transparent film, which is used as a substrate, or may have the two-layer constitution wherein either one of the layer that has the prism row or the light diffusion layer serves as a substrate, and another layer is laminated thereon. Alternatively, a layer that has a prism row, and a light diffusion layer may be directly laminated. However, use of an independent light-transmissive substrate such as a transparent substrate or a transparent film is preferable from the points that the prism row and the light diffusion layer can be formed through an application process, and control of composition, shape and the like of each layer is also easy.

That is to say, more preferable embodiment of the prism sheet of the present invention is constituted to have a light-transmissive substrate, a prism row that is formed on one surface on the light-transmissive substrate, and a'light diffusion layer that is formed on a different surface from the surface on which the prism row is formed on the substrate.

Hereinafter, each portion of the prism sheet of the present invention in the above-described preferable embodiment will be explained in detail in sequence. In addition, modified examples of the constitution will be also explained, which can be performed for each portion of the prism sheet while maintaining the above-described performances of the prism sheet.

First, the light diffusion layer of the prism sheet of the present invention contains porous particles as a light diffusion material. The properties of the porous particles are represented by the volume of fine pores and average size of fine pores. However, porous particles can be used with no particular limit if they are porous microparticles that have fine pores inside the particles. The porous particles, of which the average size of the fine pores is in the range of 1 to 50 µm and the volume of the fine pores is in the range of 0.1 to 3 ml/g, can be suitably used. The porous particles are preferably in the indefinite-shaped form rather than the spherical form as a whole such that the light path of the beam that has passed through the arrangement of the prism row and the liquid crystal pixels is more effectively disturbed. That is to say, the porous particles are preferably in the form of a polygonal shape that is composed of the sides having irregular lengths and the angles having irregular magnitudes when viewed from the cross-section. The structure of the porous particle is preferably such that primary particles are agglomerated and form agglomerated particles in indefinite-shaped form having 1 to 10 µm of the particle size. The primary particles are preferably those having 10 to 100 nm of the particle size. In addition, the irregularity preferably has broad width of the particle size distribution such that the reflection and refraction occur more effectively. Both of organic microparticles and inorganic microparticles can be used. However, among them, inorganic materials such as porous silica, porous alumina, porous titanium oxide and porous glass are more preferable because the inorganic materials easily take greater difference of the refractive index to that of a binder resin, and easily enhance reflectivity in the particle surface, and thus diffused and reflected light is effectively obtained. Furthermore, the inorganic materials are also preferable in view of easily improving the surface hardness of the light diffusion layer. Among them, particles of porous silica are more preferable.

The light diffusion layer may contain inorganic particles, organic particles or inorganic-organic hybrid material particles in addition to the above-mentioned porous particles, if necessary. For example, the light diffusion layer may contain white pigments such as titanium oxide and zinc oxide, and fillers such as calcium carbonate and talc within the range of not inhibiting properties of the light diffusion layer. The light diffusion layer may also contain organic particles such as acrylic particles and acrylic urethane particles. In addition, the layer that contains the above-mentioned particles may be laminated on the light diffusion layer.

The light diffusion layer may contain, if necessary, a curing agent, a curing catalyst, a dispersing agent, a plasticizing agent, an antistatic agent, an ultraviolet absorbing agent, an anti-deterioration agent and the like. However, the above-mentioned light diffusion layer preferably contains no substance that has absorption for the visible light region, and preferably has no attenuation of transmitted light by the presence of a substance that has absorption for the visible light region.

The formation of the light diffusion layer may be performed by applying onto a substrate, a coating material for the light diffusion layer, which contains the above-described porous particles and the like and a binder resin, and a solvent, and drying it. However, the substrate may be also integrated with the diffusion layer. For example, a substrate sheet, which also serves as a light diffusion layer as a whole, may be manufactured by a usual sheet-manufacturing method such as extrusion using a binder resin in which the porous particles are dispersed, whereby the film thickness of the whole prism sheet may be made thin. However, when the content of the porous particles is high, mechanical properties of the sheet itself are likely to be fragile, and thus in order to secure the strength, the light diffusion function of the prism sheet is preferably separated from the support function so that the transparent substrate or the transparent film is used as a support for the light diffusion layer and the prism row.

A general resin for molding, a resin for coating material and the like may be used as the binder resin without particular limitation as long as the above-mentioned porous particles can be uniformly dispersed in the resin and shaped to a sheet form, or a coating material made of the resin with added solvent can be applied onto the light-transmissive substrate to form an overlaid coating film. For example, the binder resin includes acrylic resin, vinyl chloride resin, polyester resin, polyurethane resin, styrene resin, polycarbonate resin, cycloolefin resin and the like.

The solvent that is used in the coating material for the light diffusion layer in forming the light diffusion layer by application, may be suitably selected and used from known solvents that are usually used in a coating material in consideration of solubility of a binder resin, dispersibility of the porous particles and the like, film thickness of a diffusion layer to be formed, and drying characteristic of a coating film and the like.

The important, point for the light diffusion layer formed in the present invention is that the light diffusion layer effectively diffuses the incident light as much as possible and also transmits it to the opposite side of the incident direction. Therefore, although the haze value in the portion of the light diffusion layer of the present invention depends on suppression effects for Moiré fringes and the front luminance intended to be achieved, but the haze value is preferably equal to or more than 50%, more preferably equal to or more than 55%, and more preferably equal to or more than 60%. Furthermore, the total light transmittance of the light diffusion layer is preferably equal to or more than 85% and more preferably equal to or more than 90%. Since the porous particles in the light diffusion layer scatter incident light effectively in the present invention, it is possible to transform the incident light to the diffused and transmitted light to the direction opposite to that of the incident light with very low loss, and also suppress Moiré fringes effectively. As compared to the light diffusion layer used in the conventional prism sheet, the prism sheet of the present invention attains equal or greater suppression effects for Moiré fringes, with fewer amounts of the light diffusion particles. Therefore, if compared in terms of equal suppression effects for Moiré fringes, the prism sheet of the present invention makes it possible to attain usually higher front luminance than the conventional prism sheet. In order to perform effective suppression of Moiré fringes while maintaining the luminance of the liquid crystal display surface with use of the prism sheet of the present invention, the content of the porous particles in the light diffusion layer is preferably 2 to 40 percent by mass, more preferably 5 to 30 percent by mass, and most preferably 10 to 25 percent by mass relative to 100 parts by mass of the solid content of the resin binder. Since the light diffusion layer in the prism sheet of the present invention has good diffusion efficiency of the porous particles, the film thickness can be made thinner than that of conventional one, and thus the prism sheet can be made thin. In order to achieve thinning of the light diffusion layer while maintaining suppression effects for Moiré fringes, the film thickness of the light diffusion layer is preferably 2 to 25 µm though it may be somewhat different depending on the content of the porous particles. Particularly, the film thickness is preferably 2 to 10 µm when the object is thinning of the backlight unit by thinning the total thickness of the prism sheet, particularly thinning of the liquid crystal display device for a mobile phone.

If the porous particles project from the surface of the resin binder of the light diffusion layer, the diffusion light is easily subject to great deflection from the front direction. Therefore, in order to not only suppress Moiré fringes more effectively while maintaining high front luminance, but also manage the film thickness of the whole prism sheet, the film thickness of the light diffusion layer is preferably in the range of 1 to 5 folds, more preferably 1 to 2.5 folds, and most preferably 1.5 to 2 folds of the volume average particle size of the porous particles.

Herein, for the thickness of the light diffusion layer, what is measured is not the height of the top of the projecting light diffusion material, but the height of the resin binder surface holding the light diffusion material from the sheet-like substrate.

Though the light-transmissive substrate used as a support of the prism sheet of the present invention is not particularly limited if it has enough physical strength as a support and light transmissive property, preferred is a transparent substrate. The light-transmissive substrate is selected from transparent or semi-transparent resin sheets or films such as a polyethylene terephthalate (PET) film, a polyethylene naphthalate (PEN) film, an acrylic film, a polypropylene film, polycarbonate, cycloolefin and acrylic in the aspect of smoothness of the surface or mechanical strength. Among them, a PET film or a PEN film is particularly preferred in the aspect of mechanical strength. The thickness of the substrate is preferably in the range of 5 to 300 µm, more preferably in the range of 10 to 100 µm. If the thickness of the substrate is less than 5 µm, not only handling becomes difficult, but also tendency of deteriorated processability is caused such that the curl occurs due to thermal contraction, which deteriorates workability remarkably, and the like. If the thickness of the substrate is more than 300 µm, the total thickness of the prism sheet becomes thick and thus cannot be used in a thin-type electronic device and the like, and also transmissivity of the substrate itself for the visible light is easily deteriorated, thus the front luminance of the backlight unit tends to be deteriorated. Particularly, the thickness is preferably 7 to 50 µm when the object is thinning of the backlight unit by thinning the total thickness of the prism sheet, particularly thinning of the liquid crystal display device for a mobile phone.

Easy adhesion treatment such as application of easy adhesion treatment layer or corona treatment is preferably performed on at least one surface, more preferably both surfaces of the substrate in order to improve adhesion to the prism row and/or the light diffusion layer.

The layer that has the prism row of the prism sheet of the present invention have prisms arranged, of which the sectional shape is a triangle having an apex angle, and has a prism row that has ridges that are formed in parallel to each other at equal intervals. The surface of the prism row preferably has a shape where linear unit prisms, of which the cross-section is isosceles triangle of the same shape, are arranged in parallel without a gap, and the apex angle of isosceles triangle in the cross-section of the prism row is preferably 50° to 80°, more preferably 60° to 70°. The isosceles triangles of the same shape in the cross-section makes it possible to easily manufacture the prism row, and also make the prism sheet thin, and further ensure the prism to exert functions. By the apex angle of the prism in the range of 50° to 80°, high light-collecting property in the front direction of LCD is obtained by the total reflection phenomenon in the oblique plane of the prism row when the ridges of the prism row in the prism sheet of the present invention are arranged toward the emitting surface side of the light guide plate. In addition, the interval between adjacent prism rows may be suitably determined in consideration of thinning degree of the thickness in the prism row portion, easiness of manufacturing the prism row, easiness of occurrence of Moiré fringes and the like. However, the interval is preferably 5 to 100 µm, more preferably 10 to 50 µm.

The height of the prism row also affects the interval of the prism row. However, the interval is preferably 7 to 50 μm when the object is thinning of the backlight unit by thinning the total thickness of the prism sheet, particularly thinning of the liquid crystal display device for a mobile phone.

The prism row of the prism sheet of the present invention may be formed as integrated with the support, or may be formed by separately being laminated on the support. Known methods of formation may be used for them. One example of these methods of manufacturing the prism sheet will be explained below.

For example, as disclosed in JP-A-H11-171941, a method may be used wherein continuous substrates are pushed to be pressed with a pressure roll to a mold roll, and a liquid ultraviolet-curable type resin is supplied to the initiation portion of the contact between the pressed substrate and the mold roll, and the ultraviolet is irradiated to fix the shape, and the prism sheet is released from the mold roll.

In addition, as disclosed in JP-A-2002-258410, a method may be used wherein the liquid ultraviolet-curable resin is attached to a mold roll, and then brought into contact with continuous substrates, and the ultraviolet is irradiated to fix the shape, and the prism sheet is released from the mold roll.

In addition, a method may be used wherein the ultraviolet-curable resin is applied onto a transparent substrate by a known coating method, and the surface of the ultraviolet-curable resin is brought into contact with a mold roll to be pressed in the uncured state, and the ultraviolet is irradiated to fix the shape, and the prism sheet is released from the mold roll.

The material used in the prism row of the prism sheet of the present invention for example depending on the above-described forming method, is not particularly limited if it is a transparent material, and has fluidity at first and is cured by light such as the ultraviolet to be solidified, or a material that is softened by heating to have fluidity and solidified again by cooling. For example, an ultraviolet-curable resin composition, a thermoplastic resin and the like may be used.

As the ultraviolet-curable resin composition, use can be made of those having various ultraviolet-curable oligomers/monomers such as non-saturated polyesters, acryls, vinyl ethers, maleimides, epoxys and the like as main components, and, as necessary, a reactive diluting agent, a polymerization initiator, a polymerization promoting agent, an organic solvent and the like, being blended and mixed.

As the thermoplastic resin, use can be made of a general thermoplastic resin that becomes fluid by heating such as polyethylene, polypropylene, polystyrene, acryl, polyester, polycarbonate and the like.

Among them, the ultraviolet-curable resin composition is preferably used. The reason for it is that if a thermoplastic resin is heated to higher temperature than the glass transition temperature of a substrate, trouble such as deformation of the substrate by heat may occur, and that heating or cooling time can be shortened as compared to use of a thermoplastic resin, which is advantageous to production efficiency.

As the method of manufacturing the prism sheet of the present invention, for example, a method may be used in which a light diffusion layer is formed on one surface of the substrate and then the above-described prism surface is formed on the other surface. In addition, for example, a method may be used in which a sheet having the above-described prism row is formed on one surface, and then the light diffusion layer is formed on the opposite side of the prism surface of the sheet. The layer that has the prism row may be formed on a substrate, or may be formed in integration with the substrate. However, for example, when the prism sheet has a substrate, a coating material for the light diffusion layer is applied onto a different surface from the surface on which the prism row is formed on the substrate, and dried to form the light diffusion layer. As the application method, general coating method can be used. For example, each coating method such as blade coating, knife coating, casting, dip coating, coating with an impregnating apparatus, screen coating, spin coating, reverse roll coating, air doctor coating, gravure coating, spray coating, curtain coating, extrusion coating, fountain coating, kiss coating, rod coating, squeeze coating, positive rotation roll coating and kiss roll coating can be used.

In drying the coating film, general drying method may be used. For example, drying methods such as hot air, infrared rays, microwave, induction heating, ultraviolet curing and electronic beam curing can be used.

The coating material for the light diffusion layer can be manufactured by suitably selecting and blending already-described various porous particles, binder resins, and solvents depending on selected application method, drying method, and set film thickness.

After the drying, heat curing is performed at predetermined temperature and time, as necessary.

The prism sheet manufactured as described above has the total thickness of 20 to 500 μm, preferably 20 to 100 μm considering that the backlight unit can be thinned. In the case of a backlight unit that is used in the liquid crystal display device for a mobile phone that is particularly strongly demanded for thinning, the total thickness can be less than 100 μm, more preferably 20 to 70 μm, which greatly contributes to the thinning of the display and thus mobile phone.

In order to manufacture the backlight unit for a liquid crystal display device with use of the prism sheet manufactured as described above, the prism sheet of the present invention may be arranged and fixed by a conventional known method as adjacent to the emitting surface of the light guide plate that has a light source on the and face, with the prism surface toward the emitting surface side of the light guide plate. In this case, since the lower diffusion film and the upper diffusion film can be excluded, it is possible to reduce significantly the total thickness of the backlight unit.

Furthermore, it is possible to manufacture the liquid crystal display device of the present invention by arranging and fixing the emitting surface of the backlight unit manufactured as described above on the back surface side of the liquid crystal display surface in a conventional known method.

EXAMPLES

The present invention will be explained by Examples below.

<Preparation Process of a Coating Material (a) for the Diffusion Layer>

Toluene 230 parts by mass

MEK 230 parts by mass

Indefinite-shaped porous silica "Silysia 430" 26 parts by mass
[Average size of the fine pores: 17 nm, fine pore volume: 1.25 ml/g, average particle size (by the laser method):4.1 μm, manufactured by Fuji Silysia Chemical Ltd.]

Acrylic resin solution "Acrydic 52-666" 170 parts by mass
[50% solid content, 75 of the hydroxyl group value of the solid content, manufactured by DIC Corporation] Antistatic agent "Nopcostat SN A-2" 1 parts by mass

[Imidazoline type cationic antistatic agent, manufactured by San Nopco Limited]

Polyisocyanate solution "Coronate HL" 60 parts by mass [75% solid content, HDI series, 17% effective NCO content in the solid content, manufactured by Nippon Polyurethane Industry Co., Ltd.]

Those described above were mixed with stirring by a dispersion device, to give the coating material (a) for the diffusion layer. At this time, the addition amount of the porous silica relative to the solid content of the resin binder was 20% (the mass ratio).

<Preparation Process of the Coating Material (b) for the Diffusion Layer>

Toluene 270 parts by mass
MEK 270 parts by mass
Indefinite-shaped porous silica "Silysia 430" 34 parts by mass
Acrylic resin solution "Acrydic 52-666" 200 parts by mass
Antistatic agent "Nopcostat SN A-2" 2 parts by mass
Polyisocyanate solution "Coronate HL" 70 parts by mass Those described above were mixed with stirring by a dispersion device, to give the coating material (b) for the diffusion layer. At this time, the addition amount of the porous silica relative to the solid content of the resin binder was 22% (the mass ratio).

<Preparation Process of the Coating Material (c) for the Diffusion Layer>

Toluene 310 parts by mass
Cyclohexanone 75 parts by mass
Resin particle of acrylic urethane "BC-79" 80 parts by mass
[About 6 μm of the volume average particle size, manufactured by Gifu Shellac manufacturing. Co., Ltd]
Acrylic resin solution "Acrydic WDU-938" 220 parts by mass
Antistatic agent "Nopcostat SN A-2" 6 parts by mass
Polyisocyanate solution "Coronate HL" 30 parts by mass Those described above were mixed with stirring by a dispersion device, to give the coating material (c) for the diffusion layer. At this time, the addition amount of the resin particle relative to the solid content of the resin binder was 60% (the mass ratio).

<Preparation Process of the Coating Material (d) for the Diffusion Layer>

Toluene 310 parts by mass
Cyclohexanone 70 parts by mass
Acrylic microparticle "MX-150" 100 parts by mass
[1.5 μm of the volume average particle size, manufactured by Soken Chemical & Engineering Co., Ltd.]
Acrylic resin solution "Acrydic WDU-938" 160 parts by mass
Antistatic agent "Nopcostat SN A-2" 5 parts by mass
Polyisocyanate solution "Coronate HL" 22 parts by mass Those described above were mixed with stirring by a dispersion device, to give the coating material (d) for the diffusion layer. At this time, the addition amount of the resin particle relative to the solid content of the resin binder was 100% (the mass ratio).

<Preparation Process of the Coating Material (e) for the Diffusion Layer>

The coating material (e) for the diffusion layer was obtained in the similar manner as the preparation of the coating material (d) for the diffusion layer except that the resin particle of acrylic urethane "BC-79" was used as a diffusion material. At this time, the addition amount of the resin particle relative to the solid content of the resin binder was 100% (the mass ratio).

<Preparation Process of the Coating Material (f) for the Diffusion Layer>

The coating material (f) for the diffusion layer was obtained in the similar manner as the preparation of the coating material (d) for the diffusion layer except that non-true spherical acrylic microparticle "Tec Polymer L-XX-24BF" (3 to 12 μm of the average particle size (sphere converted diameter), manufactured by Sekisui Plastics Co., Ltd.) was used as a diffusion material. At this time, the addition amount of the resin particle relative to the solid content of the resin binder was 100% (the mass ratio).

<Preparation Process of the Coating Material (g) for the Diffusion Layer>

The coating material (g) for the diffusion layer was obtained in the similar manner as the preparation of the coating material (d) for the diffusion layer except that nonspherical acrylic microparticle "HK-1030" (3.0 μm of the volume average particle size, manufactured by Soken Chemical & Engineering Co., Ltd.) was used as a diffusion material. At this time, the addition amount of the resin particle relative to the solid content of the resin binder was 100% (the mass ratio).

<Preparation Process of the Coating Material (h) for the Diffusion Layer>

The coating material (h) for the diffusion layer was obtained in the similar manner as the preparation of the coating material (d) for the diffusion layer except that acrylic microparticle "MX-500" (5.0 μm of the volume average particle size, manufactured by Soken Chemical & Engineering Co., Ltd.) was used as a diffusion material. At this time, the addition amount of the resin particle relative to the solid content of the resin binder was 100% (the mass ratio).

<Preparation Process of the Coating Material (i) for the Diffusion Layer>

Toluene 330 parts by mass
Cyclohexanone 90 parts by mass
Acrylic resin particle "MX-500" 50 parts by mass
Acrylic resin solution "Acrydic WDU-938" 330 parts by mass
Antistatic agent "Nopcostat SN A-2" 10 parts by mass
Polyisocyanate solution "Coronate HL" 45 parts by mass Those described above were mixed with stirring by a dispersion device, to give the coating material (i) for the diffusion layer. At this time, the addition amount of the resin particle relative to the solid content of the resin binder was 25% (the mass ratio).

Examples 1 and 2 and Comparative Examples 1 To 7

<Application onto a Substrate, Drying and Curing Process>

As a substrate, a polyethylene terephthalate (PET) film having thickness 38 μm was used. An ultraviolet-curable resin composition, which had been heated to about 80 degrees Celsius to have lower viscosity, was applied onto one surface of the substrate in the thickness of 30 μm by a die-coating method. The ultraviolet-curable resin composition used was UNIDIC RC27-637 (a mixture of nonsaturated polyester, acrylate monomer, photoinitiator and the like, manufactured by DIC Corporation). Next, a tabular mold, in which a prism row plate having prism pitch: 12.4 μm, prism height: 10 μm and apex angle: 64 degrees is formed, was heated at 110 degrees Celsius for 2 minutes along with the above-described substrate on which the uncured resin layer had been formed. The surface of the uncured resin layer on the substrate was overlapped to the surface of the mold, and the back surface of the substrate was lightly pressed with a roller. The ultraviolet was irradiated from the back surface side of the substrate to cure and fix the uncured resin. The ultraviolet lamp used was a high pressure mercury lamp, and the irradiation energy was 600 mJ in the integrated value. The laminate of the mold, the resin and the substrate was cooled to around room temperature, and the substrate was released from the mold, to give those in which the predetermined prism is formed on the substrate surface.

Onto the other surface, the above-described coating materials (a) and (b) for the diffusion layer were applied in about 5 μm of dry film thickness, and dried with hot air to give dry coating films of the diffusion layers, which were used as the prism sheets of Examples 1 and 2, respectively. In a similar manner, any of the above-described coating materials (c) to (i) for the diffusion layer was applied in 2 to 10 μm of the dry film thickness depending on the particle size of the diffusion material particles used (see Tables 1 and 2), and dried with hot air to give a dry coating film of the diffusion layer, and the prism sheets of each of the Comparative Examples 1 to 7 were obtained. The film thickness of the light diffusion layer was set to a value close to the volume average particle size of each diffusion material so that the diffusion material was stably fixed to the coating film, and projection of the diffusion material was partially projected to thereby exert good diffusion function. Following the completion of the above-described application process, the obtained one was kept in a constant temperature chamber of 40 degrees Celsius for 48 hours to promote the curing reaction.

Evaluation of the properties of the prism sheets manufactured as described above was performed in the method below.
<Evaluation of the Optical Properties>

A backlight unit of a commercially-available mobile phone was disassembled, and 4 pieces of films (the lower light diffusion film, two pieces of the prism sheets and the upper light diffusion film) integrated therein were exchanged with the samples. The prism sheet of the present invention was integrated into the backlight unit so as to make the prism surface to be the emitting surface side of light guide plate, and the front luminance of the backlight unit was measured. The measuring device used was a multipoint luminance meter, EyeWin390c (manufactured by I-System Co., Ltd.). The measured region was the rectangular region in the central portion in the emission surface of the backlight unit, excluding 15% width of the total transverse width from the left and right ends on each emission surface of the backlight unit, and 15% width of the total longitudinal width from the upper and lower ends on each emission surface of the backlight unit. This region was divided into 9 of 3×3, and the luminance of each region was measured, and the average luminance value was calculated by averaging them. Measurement of the haze was performed with a haze meter, NDH2000 (manufactured by Nippon Denshoku Industries, Co., Ltd.). The film thickness was measured with an electronic micrometer, K402B (manufactured by Anritsu Company) at 5 points, and the minimum value was used.

For the evaluation of Moiré, the liquid crystal unit of a mobile phone (Vodafon V601SH) was placed on the above-described backlight unit for which the luminance was measured, and inspected visually, and evaluation was performed on the basis of the 5-step evaluation below.
(Evaluation Value of Moiré Fringes)

Evaluation value 1 Occurrence of Moiré fringes can be definitely found, and luminance uniformity is also low.

Evaluation value 2 Luminance uniformity improves, however, occurrence of Moiré fringes can be definitely found.

Evaluation value 3 Obscurely, but easily, the presence of Moiré fringes can be found.

Evaluation value 4 If gazed at, Moiré fringes can be found.
(Evaluation value 4.5 Moiré fringes is difficult to find)

Evaluation value 5 No Moiré fringe is found.

In the prism sheet of the present invention, it is possible to prevent occurrence of Moiré fringes without reducing the front luminance of the backlight unit or the display surface of the liquid crystal display device. However, there is the trade-off relationship between the improvement of the front luminance and the reduction of Moiré fringes in the backlight unit or the liquid crystal display device. To show effects of the present invention more definitely, comparison was performed of the front luminance of the backlight unit used per certain evaluation value of Moiré fringes. From the fact that the evaluation value of Moiré fringes is equal to or greater than 4 in the state where the Moiré fringes hardly occur, the level of evaluation value corresponding to practicability can be set 4 or more. Furthermore, for each of 4 and 4.5 of the evaluation values of Moiré fringes, measured values of the front luminance in the backlight unit were shown for each of the Examples and the Comparative Examples.

The evaluation results when the Moiré evaluation value was 4, were shown in Table 1; the evaluation results when the Moiré evaluation value was 4.5, were shown in Table 2; and as reference data, the evaluation results when the Moiré evaluation value was, 3.5 were shown in Table 3. Meanwhile, in order to set a light diffusion layer having good front luminance, it has been preferable to adjust the haze value of the light diffusion layer at least in the range of 40% to 95%. Thus, the manufactures in the Examples and the Comparative Examples were performed this time focusing on those meeting the above-described haze value.

TABLE 1

Evaluation results when the Moiré evaluation value is 4

| | | Blending Composition in the diffusion layer | | | | | | | | |
|---|---|---|---|---|---|---|---|---|---|---|
| | | Coating | Diffusion Material | | | | Amount of Diffusion Material relative to the resin | Film thickness | Optical property | |
| | | Material for the diffusion layer | Product Name | Kind | Volume average particle size (μm) | Shape | binder (solid content) Mass (%) | of the diffusion layer (μm) | Moiré evaluation value | Front luminance (cd/m²) | Haze (%) |
| Ex. | 1 | a | Silysia 430 | Porous silica | 4.1 | Porous indefinite- | 20 | 5 | 4 | 2176 | 61.6 |

TABLE 1-continued

Evaluation results when the Moiré evaluation value is 4

| | | Coating Material for the diffusion layer | Diffusion Material Product Name | Kind | Volume average particle size (μm) | Shape | Amount of Diffusion Material relative to the resin binder (solid content) Mass (%) | Film thickness of the diffusion layer (μm) | Moiré evaluation value | Front luminance (cd/m²) | Haze (%) |
|---|---|---|---|---|---|---|---|---|---|---|---|
| Comp. Ex. | 2 | c | BC-79 | Resin particle of acrylic urethane | 6 | shaped True sphere | 60 | 9 | 4 | 1976 | 75.1 |
| | 3 | d | MX-150 | Acrylic resin particle | 1.5 | True sphere | 100 | 3 | 4 | 1927 | 73.1 |

TABLE 2

Evaluation results when the Moiré evaluation

| | | Coating material for the diffusion layer | Diffusion Material Product Name | Kind | Volume average particle size (μm) | Shape | Amount of Diffusion material relative to the resin binder (solid content) Mass (%) | Film Thickness of the diffusion layer (μm) | Moiré evaluation value | Front luminance (cd/m²) | Haze (%) |
|---|---|---|---|---|---|---|---|---|---|---|---|
| Comp. Ex. | 2 | b | Silysia 430 | Porous silica | 4.1 | Porous indefinite-shaped | 22 | 5 | 4.5 | 2002 | 84.4 |
| Comp. Ex. | 3 | e | BC-79 | Resin particle of acrylic urethane | 6.0 | True sphere | 100 | 10 | 4.5 | 1859 | 91.5 |
| | 4 | f | L-XX-24BF | Acrylic resin particle | 3.0-12.0 | Non-sphere | 100 | 4 | 4.5 | 1901 | 86.4 |
| | 5 | g | HK-1030 | Acrylic resin particle | 3.0 | Non-sphere | 100 | 3 | 4.5 | 1752 | 91.7 |
| | 6 | h | XX-500 | Acrylic resin particle | 5.0 | True sphere | 100 | 5 | 4.5 | 1789 | 83.9 |

TABLE 3

Evaluation results when the Moiré evaluation value is 3

| | | Coating Material for the diffusion layer | Diffusion Material | | | | Amount of Diffusion Material relative to the resin binder (solid content) Mass (%) | Film thickness of the diffusion layer (μm) | Optical property | | |
|---|---|---|---|---|---|---|---|---|---|---|---|
| | | | Product Name | Kind | Volume average particle size (μm) | Shape | | | Moiré evaluation value | Front luminance (cd/m²) | Haze (%) |
| Comp. Ex. | 7 | i | MX-500 | Acrylic resin particle | 5 | True sphere | 25 | 5 | 3 | 2098 | 58.2 |

As seen from Tables 1 and 2, in each of the Moiré evaluation values, those using the prism sheets of the Example that contain the porous particles in the light diffusion layer, show high front luminance in the backlight unit. In comparison to this, those using the prism sheets of the Comparative Examples that contain conventional resin particles in the light diffusion layer, have the front luminance not reaching 2000 (cd/m²). Therefore, improvement of the front luminance by 5 to 13% is obtained by using the prism sheet of the present invention. Furthermore, as for the emission light property, it is shown as in Table 3 that the evaluation value of Moiré fringes becomes reduced to 3 or less if it is tried to maintain the front luminance of the backlight unit to 2000 (cd/m²) or more with use of a conventional prism sheet. Even with use of other conventional resin particles, results were nearly the same.

Examples 3 to 5

(The Relationship of the Particle Size of the Porous Particles and the Film Thickness of the Light Diffusion Layer)

The coating materials for the diffusion layer were manufactured as below in order to investigate the relationship of the volume average particle size of the porous particles and the film thickness of the light diffusion layer.

<Preparation Process of the Coating Material (j) for the Diffusion Layer>

Toluene 280 parts by mass
Cyclohexanone 80 parts by mass
Indefinite-shaped porous silica "Silysia 430" 30 parts by mass
[Average size of the fine pores: 17 nm, fine pore volume: 1.25 ml/g,
Average particle size (by the laser method): 4.1 μm, manufactured by Fuji Silysia Chemical Ltd.]
Acrylic resin solution "Acrydic WDU-938" 330 parts by mass
[50% solid content, manufactured by DIC Corporation]
Antistatic agent "Nopcostat SN A-2" 2 parts by mass
[Imidazoline type cationic antistatic agent, manufactured by San Nopco Limited]
Polyisocyanate solution "Coronate HL" 40 parts by mass
[75% solid content, HDI series, 17% effective NCO content in the solid content, manufactured by Nippon Polyurethane Industry Co., Ltd.]

Those described above were mixed with stirring by a dispersion device, to give the coating material (a) for the diffusion layer. At this time, the addition amount of the porous silica relative to the solid content of the resin binder was 15% (the mass ratio).

In a similar manner to those of Examples 1 and 2 and Comparative Examples 1 to 7, polyethylene terephthalate (PET) films having 38 μm thicknesses were used as the substrate. On one surface of the substrate, predetermined prism shape was formed, and then on the other surface, the above-described coating material (j) for the diffusion layer was applied in 7, 5 and 9 μm, respectively of the dry film thickness, and dried with hot air to give a dry coating film for the diffusion layer, which were used as the prism sheets of Examples 3, 4, 5, respectively. Following the completion of the above-described application process, the obtained one was kept in a room of 40 degrees Celsius constant temperature for 48 hours to promote the curing reaction.

The results are shown in Table 4.

TABLE 4

| | | Coating Material for the diffusion layer | Diffusion Material | | | | Amount of Diffusion Material relative to the resin binder (solid content) Mass (%) | Film thickness of the diffusion layer (μm) | Optical property | | |
|---|---|---|---|---|---|---|---|---|---|---|---|
| | | | Product Name | Kind | Volume average particle size (μm) | Shape | | | Moiré evaluation value | Front luminance (cd/m²) | Haze (%) |
| Ex. | 3 | j | Silysia 430 | Porous silica | 4.1 | Porous indefinite-shaped | 15 | 7 | 4 | 2203 | 72.8 |
| | 4 | j | | | | | | 5 | 4 | 2148 | 75.4 |
| | 5 | j | | | | | | 9 | 4 | 2184 | 76.9 |

As shown in Example 3, high front luminance is shown by using 7 μm thickness (film thickness/particle size=1.7) of the light diffusion layer. On the other hand, as shown in Example 4, when the thickness of the light diffusion layer is made to be thin to about 5 μm (film thickness/particle size=1.22), deflection from the front of the diffusion light tends to increase and thus the front luminance tends to decrease from the influence of the emission light property of the diffusion layer. As shown in Example 5, if the thickness of the light diffusion layer is made to be thick to 9 μm (film thickness/particle size=2.2), the light diffusion layer has high front luminance, but is disadvantageous in terms of thinning. As described above, the thickness of the light diffusion layer that contains porous silica is preferably set in the range of 1 to 2.5 folds, more preferably in the range of 1.5 folds to 2 folds of the average particle size of porous silica.

Examples 6 and 7

(Comparison of Spherical Porous Particles to Indefinite-Shaped Porous Particles)

In order to compare indefinite-shaped porous particles to spherical porous particles, a coating material for the diffusion layer was manufactured as below using spherical porous particles.

<Preparation Process of the Coating Material (k) for the Diffusion Layer>

Toluene 250 parts by mass
Cyclohexanone 72 parts by mass
Spherical porous silica "Sylosphere C-1504" 27 parts by mass
[Fine pore volume: 1.5 ml/g, average particle size (by the laser method): 4 μm, manufactured by Fuji Silysia Chemical Ltd.]
Acrylic resin solution "Acrydic WDU-938" 300 parts by mass
Antistatic agent "Nopcostat SN A-2" 2 parts by mass
Polyisocyanate solution "Coronate HL" 40 parts by mass Those described above were mixed with stirring by a dispersion device, to give the coating material (k) for the diffusion layer. At this time, the addition amount of the porous silica relative to the solid content of the resin binder was 15% (the mass ratio).

In the similar manner to those of Examples 1 and 2 and Comparative Examples 1 to 7, polyethylene terephthalate (PET) films having 38 μm thicknesses were used. On one surface of the substrate, predetermined prism shape was formed, and on the other surface, the coating material (j) for the diffusion layer was applied in 6 μm dry film thickness, which was taken as the prism sheet of Example 6. The one where the coating material (k) for the diffusion layer was applied in 6.5 μm dry film thickness was taken as the prism sheet of Example 7.

The results are shown in Table 5.

TABLE 5

| | | Blending Composition in the diffusion layer | | | | | Optical property | | |
|---|---|---|---|---|---|---|---|---|---|
| | | | Diffusion Material | | | Amount of Diffusion material relative to the resin binder (solid content) Mass (%) | Film Thickness of the diffusion layer (μm) | | | |
| | | Coating material for the diffusion layer | Product Name | Kind | Volume average particle size (μm) | Shape | | | Moiré evaluation value | Front luminance (cd/m²) | Haze (%) |
| Ex. | 6 | j | Silysia 430 | Porous silica | 4.1 | Porous indefinite-shaped | 15 | 6 | 4 | 2176 | 62.6 |
| Comp. Ex. | 7 | k | Sylosphere C-1504 | | 4.5 | Porous sphere | | 6.5 | 4 | 2076 | 78.4 |

As seen from Table 5, porous indefinite-shaped particles have better diffusion efficiency than porous spherical particles, and can suppress Moiré fringes usually with less addition amount. In addition, among the porous particles, spherical particles rather than indefinite-shaped particles are considered to have stronger remaining tendency to deflect incident light in specific direction, and as a result, have reduced front luminance.

By using a backlight unit that uses the prism sheet of the present invention, it is possible to effectively suppress occurrence of Moiré fringes without reducing the luminance, for example, of the backlight unit or the display surface of the liquid crystal display device. Furthermore, the upper diffusion film has been conventionally used in order to give uniform luminance and increase in viewing angle in addition to suppression of Moiré fringes. However, with the prism sheet of the present invention, it is possible to realize these functions exerted by the conventional upper diffusion film, while maintaining the luminance of the liquid crystal display surface. In fact, under the demand for thinning and constraint in the liquid crystal display device, the improvement of the luminance of the backlight unit and the liquid crystal display surface differs in preference only by several % and thus significance is very great of the fact that the prism sheet of the present invention can suppress Moiré fringes while maintaining the front luminance.

| REFERENCE NUMERALS | |
|---|---|
| 1 | Liquid crystal module |
| 2 | Backlight unit |
| 3 | Light source |
| 4 | Reflection film |
| 5 | Light guide plate |
| 6 | Reflection sheet |
| 7 | Light diffusion film (Lower diffusion film) |
| 8 | Prism sheet |
| 9 | Light diffusion film (Upper diffusion film) |
| 12 | Conventional general backlight unit |

REFERENCE NUMERALS

| | |
|---|---|
| 13, 23 | Light source |
| 15, 25 | Light guide plate |
| 17 | Light diffusion film (Lower diffusion film) |
| 18 | Conventional general prism sheet |
| 19 | Substrate |
| 20 | Prism row |
| 22 | Backlight unit using the prism sheet of the present invention |
| 30 | Prism sheet of the present invention |
| 31 | Base material |
| 32 | Prism row |
| 33 | Light diffusion layer in the prism sheet of the present invention |

The invention claimed is:

1. A prism sheet arranged on an emitting surface of a light guide plate in a backlight unit, the prism sheet comprising:
a prism row on an incident surface, side of a light-transmissive substrate; and
a light diffusion layer that contains porous particles on the emitting surface side of the light transmissive substrate;
wherein the porous particles are irregular porous silica particles, the structure of which is such that primary particles are agglomerated and form agglomerated particles in indefinite-shaped form having 1 to 10 μm of the particle size, and the light diffusion layer is formed by a coating material containing a resin binder and the porous silica particles, wherein the light diffusion layer has a dry thickness of 2 to 10 μm, wherein the content of the porous particles in the light diffusion layer is 5 to 20 parts by mass relative to 100 parts by mass of the resin binder.

2. The prism sheet according to claim 1, wherein the dry film thickness of the light diffusion layer is 1 to 2.5 folds of a volume average particle size of the porous particles.

3. The prism sheet according to claim 1, wherein the apex angle of the prism row is 50° to 80°.

4. The prism sheet according to claim 1, wherein a fine pore volume of the porous particles is 0.1 to 3 ml/g, and an average size of the fine pores of the porous particles is 1 to 50 nm.

5. A backlight unit for a liquid crystal display device comprising;
a light source arranged on at least one end face of a light guide plate, and
a prism sheet according to claim 1 arranged on at least one emitting surface side such that prism ridges of the prism sheet are arranged toward the emitting surface of the light guide plate.

6. A liquid crystal display device comprising a backlight unit according to claim 5.

7. The prism sheet according to claim 1, wherein the thickness of the light-transmissive substrate is 10 to 100 μm.

8. A backlight unit for a liquid crystal display device comprising;
a light source arranged on at least one end face of a light guide plate, and
a prism sheet according to claim 1 arranged on at least one emitting surface side such that prism ridges of the prism sheet are arranged toward the emitting surface of the light guide plate.

9. A liquid crystal display device comprising the backlight unit according to claim 8.

* * * * *